US006738732B2

(12) United States Patent
Durbin et al.

(10) Patent No.: US 6,738,732 B2
(45) Date of Patent: May 18, 2004

(54) SYSTEM AND METHOD FOR GRAPHICALLY PROVIDING/ANALYZING OPERATIONAL COMPACTOR STATUS INFORMATION OF A WASTE COMPACTOR CONTAINER

(75) Inventors: Martin J. Durbin, Oak Forest, IL (US); Jay S. Simon, Northbrook, IL (US)

(73) Assignee: One Plus Corp., Northbrook, IL (US)

( * ) Notice: Subject to any disclaimer, the term of this patent is extended or adjusted under 35 U.S.C. 154(b) by 70 days.

(21) Appl. No.: 10/095,859

(22) Filed: Mar. 12, 2002

(65) Prior Publication Data

US 2003/0172817 A1 Sep. 18, 2003

(51) Int. Cl.$^{7}$ .................................................. G06F 11/30
(52) U.S. Cl. .......................................... 702/188; 100/43
(58) Field of Search ............................ 702/188, 33, 34, 702/35, 36, 41, 44, 47, 113, 114, 118, 138, 140, 180, 182, 183, 184, 189; 100/43

(56) References Cited

U.S. PATENT DOCUMENTS

| | | | |
|---|---|---|---|
| 4,773,027 | A | 9/1988 | Neumann |
| 5,016,197 | A | 5/1991 | Neumann et al. |
| 5,173,866 | A | 12/1992 | Neumann et al. |
| 5,214,594 | A | 5/1993 | Tyler et al. |
| 5,299,142 | A | 3/1994 | Brown et al. |
| 5,299,493 | A | 4/1994 | Durbin et al. |
| 5,303,642 | A | 4/1994 | Durbin et al. |
| 5,558,013 | A | 9/1996 | Blackstone, Jr. |
| 5,963,920 | A | 10/1999 | Rose et al. |
| 5,967,028 | A | 10/1999 | Schomisch et al. |
| 6,003,441 | A | 12/1999 | Little |
| 6,021,712 | A | 2/2000 | Harrop |
| 6,123,017 | A | 9/2000 | Little et al. |
| 6,148,291 | A | 11/2000 | Radican |

*Primary Examiner*—Marc S. Hoff
*Assistant Examiner*—Edward Raymond
(74) *Attorney, Agent, or Firm*—Wood, Phillips, Katz, Clark & Mortimer

(57) ABSTRACT

A system and method is provided, which monitors multiple pressure readings of the compactor assembly during each of one or more compaction cycles, and upon request, graphically displays the monitored information corresponding to one or more of the compaction cycles, thereby providing a visual indication of the operational status of the waste compactor container.

18 Claims, 5 Drawing Sheets

SYSTEM AND METHOD FOR GRAPHICALLY PROVIDING/ANALYZING OPERATIONAL COMPACTOR STATUS INFORMATION OF A WASTE COMPACTOR CONTAINER

TECHNICAL FIELD

The invention relates generally to systems and methods for monitoring the operation of waste compactor containers. More particularly, the invention relates to systems and methods for monitoring multiple pressure readings of the compactor assembly during each of one or more compaction cycles, and upon request, graphically displaying the monitored information.

BACKGROUND OF THE INVENTION

Traditionally, refuse generators have contracted with waste haulers to pick-up and haul away the accumulated waste. Historically, such contracts have provided for regularly scheduled pick-up times, which occur at pre-specified times, regardless of whether the waste container is full, not yet full, or whether the trash in the waste container has long since been overflowing the container. Trash overflowing from the waste container, being seen as the greater problem, has generally resulted in a pick-up schedule, which assures that most if not all of the regularly scheduled pick-ups occur, when the waste container is not yet overflowing and generally when the waste container is not yet full. As a result a greater number of waste pick-ups are scheduled and subsequently take place earlier than would have been necessary, if the hauler had waited, in each instance, until the waste container was full. The costs associated with the additional refuse pick-ups have largely been passed along and/or are directly paid for by the refuse generator.

Refuse generators are increasingly finding that an economic benefit can be realized by changing from a regular pick-up schedule to an on-demand pick-up schedule. This is despite the fact that, per pick-up, on-demand pick-ups are generally more expensive than regularly scheduled pick-ups, and further despite the fact that there is generally a cost associated with monitoring the waste container to determine when the waste container is full. In most instances the additional costs associated with monitoring the waste container are not enough to offset the expected savings from the reduced number of pick-ups.

In order to monitor the fullness of the waste container, monitoring systems have been used in connection with respective waste containers. Often times the monitoring systems include a corresponding communications link, which allows the monitoring system to communicate to a remote computer. Where the computer is coupled to multiple monitoring systems, the same computer can centrally manage the one or more waste containers. At least one such system for managing trash compactor containers is disclosed in U.S. Pat. No. 5,303,642. Generally, in at least one embodiment of such a system, the amount of force or hydraulic pressure applied to a ram for compacting the trash within the respective container is monitored over the last one or more compaction strokes. The measured force readings are then analyzed and a level of fullness is determined. More specifically, a maximum pressure signal value is determined, which has been found to generally correspond to a compactor's level of fullness. The maximum pressure signal value is then compared to a predetermined threshold value, whereupon after the determined level of fullness equals or exceeds the predefined threshold value for a set number of compaction cycles, the monitoring system initiates a pick-up request.

At least one prior system maintains a record of the maximum pressure readings for each of the last several compaction cycles for determining a level of fullness, over time. Such a record can be used to additionally confirm, when previous pick-ups have occurred, and whether or not the compactor container was full at the time the pick-up was made.

While historically generally only a single maximum pressure reading has been relied upon for determinations of compactor container status, the present invention recognizes that additional useful information, concerning the operational status of the waste compactor container, can be obtained from other pressure readings monitored during a compaction stroke. Multiple pressure readings can be used together to illustrate how the pressure changes over time throughout the compaction stroke.

These readings, and the corresponding curve associated with the readings, can be compared against previously stored examples of normal or expected pressure curves. To the extent that the monitored pressure curve deviates from the expected norms, it may provide important clues as to the operational status of the waste compactor container.

In some instances where a waste compactor has failed and is no longer operational, information associated with the last one or last several compaction strokes, if available, can sometimes provide important clues as to the nature of the failure. Where information concerning the last one or last several compactions is remotely available, maintenance personnel may be able to determine one or more likely causes of the failure and insure that they have available to them the necessary parts or equipment for servicing the anticipated problem(s), when they are dispatched to handle the failure.

Consequently, a system for monitoring the operation of a waste compactor container, which monitors multiple pressure reading, over time, during each of the one or more monitored compaction cycles would be beneficial, which could then be made subsequently available for analysis.

SUMMARY OF THE INVENTION

A system is provided for monitoring the operation of a waste compactor container. The system includes a waste container for receiving waste material, a compactor assembly, coupled to the waste container, for compacting the waste material received within the waste container, and a monitoring unit, coupled to the compactor assembly, for monitoring the operation thereof. The monitoring unit includes a pressure gauge for measuring the amount of pressure applied by the compactor assembly during a compaction cycle.

The system further includes a processor unit, coupled to the pressure gauge.

The processor includes prestored instructions for sampling multiple pressure readings, over time, during each of the one or more monitored compaction cycles. The processor further includes a storage unit for storing the sampled multiple pressure readings, and an interface unit including an input device for receiving a compactor cycle operation status request for one or more of the compaction cycles, and a display device for displaying the plurality of pressure readings of each of the one or more requested compaction cycles, in time sequence.

In one aspect of the invention, the processor is part of the monitoring unit. In another aspect of the invention, the processor is part of a remote central computer. In a further aspect of the invention, where the processor is part of a remote central computer, the remote central computer is coupled to multiple monitoring units corresponding to multiple waste compactor containers.

In a further embodiment, a method is provided, which monitors the operation of a waste compactor container including a waste container, a compactor assembly, and a monitoring unit. The method includes monitoring a plurality of pressure readings, over time, during each of one or more compaction cycles, and storing the plurality of pressure readings for each of the one or more monitored compaction cycles. The method further includes receiving a compaction cycle display request for one or more of the stored compaction cycles, and displaying the plurality of pressure readings of each of the one or more requested compaction cycles, in time sequence.

In one aspect of the invention, the method further includes comparing the monitored plurality of pressure readings with one or more prestored sets of baseline pressure readings corresponding to normal or anticipated error free operation, and determining the existence of any deviation of the operation of the waste compactor container from the expected normal operation. The method still further provides for determining a need for maintenance of the waste compactor container, based at least in part on the comparison of the monitored plurality of pressure readings with the one or more prestored sets of baseline pressure readings.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
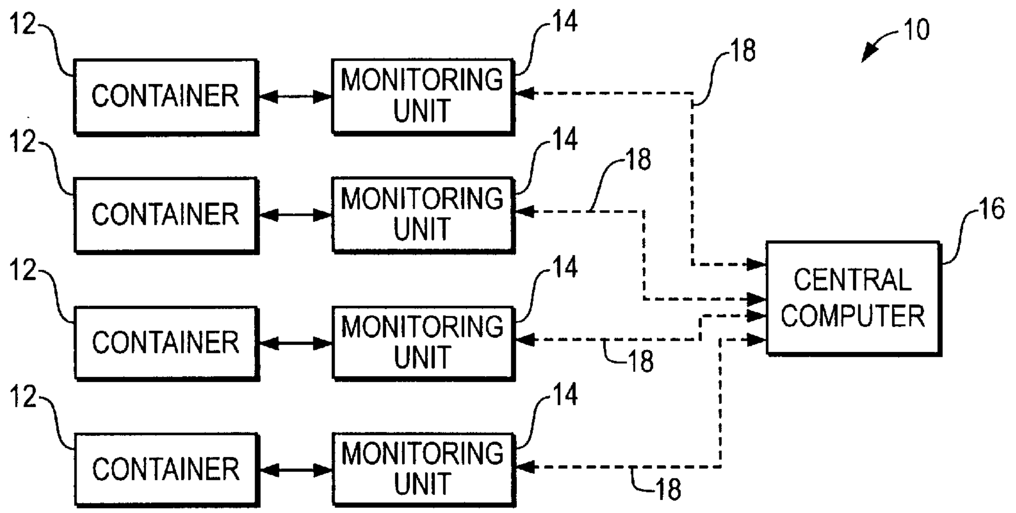
FIG. 1 is a block diagram a waste compactor container network in accordance with at least one embodiment of the present invention.

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

FIG. 1 illustrates a block diagram of an exemplary compactor container network 10 according to at least one embodiment of the present invention. The compactor container network includes one or more waste compactor containers 12, each compactor container having a respective monitoring unit 14. The monitoring units 14 communicate with a central computer 16 via a corresponding communication link 18, which can incorporate wire-based and/or wireless type communication systems. It will be understood by those of ordinary skill in the art that the present invention is applicable to compactor container networks having any number of compactor containers and respective monitoring units. In some instances, the number of compactor containers in a compactor container network can exceed one hundred.

Figure 2:
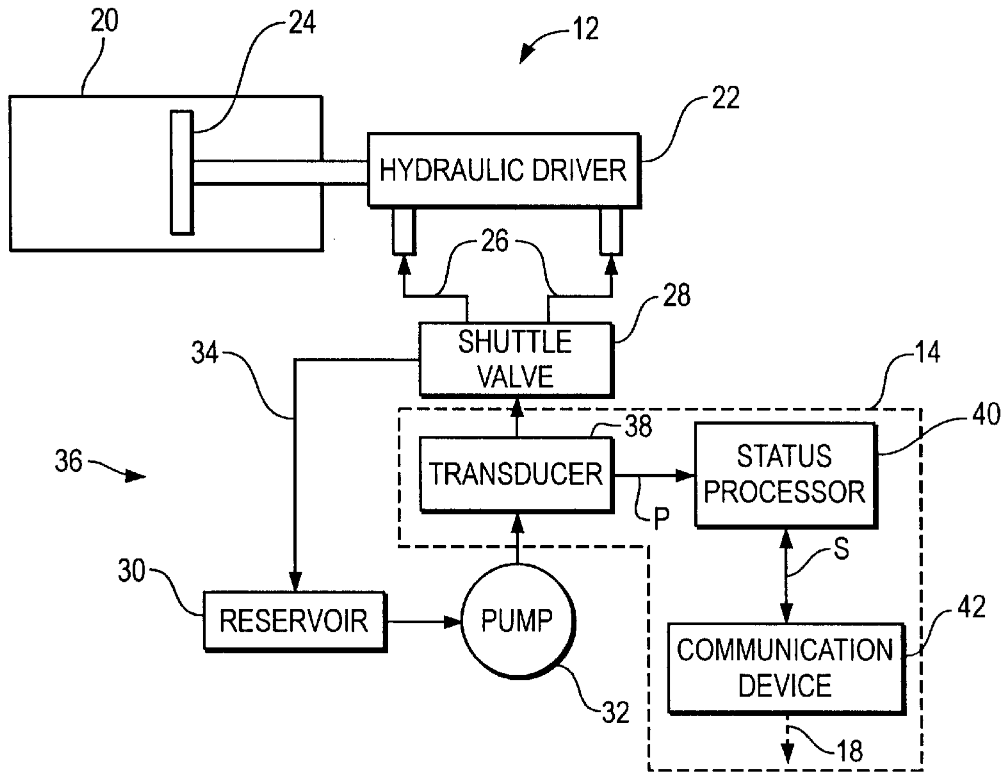
FIG. 2 is a block diagram of one embodiment of a waste compactor container and a corresponding monitoring unit for use separately, or in the waste compactor container network illustrated in FIG. 1.

Referring to FIG. 2, a typical waste compactor container, generally depicted by the reference numeral 12, includes a container 20, equipped with a compacting assembly having a hydraulic driver 22 which includes a ram 24, to compact waste received in container 20. The hydraulic driver 22 receives pressurized hydraulic fluid via hydraulic lines 26 to effect reciprocal movement of the ram 24 in a controlled manner using a shuttle valve 28. Hydraulic fluid is stored in a reservoir 30 which under the control of a pump 32 and during the compaction of the waste contents in the container 20, provides pressurized hydraulic fluid to the shuttle valve 28, which is returned from the shuttle valve 28 to the reservoir 30 via a return line 34. As will be recognized by those of ordinary skill, the reservoir 30, pump 32, shuttle valve 28 and return line 34 form a hydraulic circuit 36. The aforementioned compactor container structure is well known in the art and the details thereof are set forth in U.S. Pat. No. 5,303,642, the entire writing and subject matter of which are incorporated herein by reference.

The monitoring unit 14, provides an indication of the status of container 20. For example, the monitoring unit 14 may comprise a pressure transducer 38 disposed in the hydraulic fluid path of the hydraulic circuit 36 at the outlet of the pump 32 to generate a signal (P) indicative of the hydraulic pressure being applied to the hydraulic driver 16. The signal (P) is conveyed to a status processor 40, which preferably includes a microprocessor based computer executing appropriate instructions for determining the compactor container status, based on the signal (P), and generating a compactor container status signal (S), representing status information associated with the container 20.

The monitoring unit 14 may determine the compactor container status locally, and an example of such is similarly disclosed in U.S. Pat. No. 5,303,642. By determining the maximum pressure experienced by the transducer 38 during one or more compaction strokes of the ram 24, the monitoring unit 14 can produce a compactor container status signal (S) representative of the status of the compactor container including the level of fullness. An indication of the level of fullness can be either determined locally and communicated as part of the compactor container status signal (S), or the details of the one or more compaction strokes including the information representative of the hydraulic pressures applied to the hydraulic driver 22 during the compaction stroke can be communicated to a central computer 16 and the compactor container status determined remotely.

In addition to determining the maximum pressure experienced during one or more compaction strokes, the monitoring and storage of multiple pressure readings over time throughout a compaction stroke can similarly be beneficial. Together the multiple monitored pressure readings can be used to form a pressure curve or envelope, which is representative of the operation of the waste compactor and the waste compactor container status.

By analyzing or reviewing the multiple pressure readings, it may be possible to determine and diagnose potential problems, which might be occurring in connection with the operation of the waste compactor container. For example, the pressure curve(s) of recent waste compactions can be reviewed against one or more sets of previously stored expected or baseline pressure curves. It is similarly possible to review recent pressure curves in combination with sets of pressure curves monitored and recorded during waste compactions in which known problems or failures were occurring. In this way it may be possible to diagnose the existence of a fault or a failure, and in some instances it may also possible to identify a specific type of failure.

A predetermination of possible failures can be very useful, in that this knowledge could be used by a service technician to insure that they are equipped to efficiently handle and diagnose the likely potential problems being experienced by the waste compactor container. For example, the technician could insure that they have available diagnostic equipment and/or spare parts specific to the anticipated failure(s), thereby making it more likely for the problem(s), if any, to be efficiently resolved.

The monitoring unit 14 also includes a communication device 42, such as a modem, in communication with the status processor 40, which can communicate to the central computer 16 or another remote computer, through a communication link/interface 18. Communication device 42 conveys the status signal (S) via a communication link 18, which as noted previously may incorporate wire-based type communication system, such as a telephone network, and/or a wireless type communication systems, such as cellular or radio communication networks.

Figure 3:
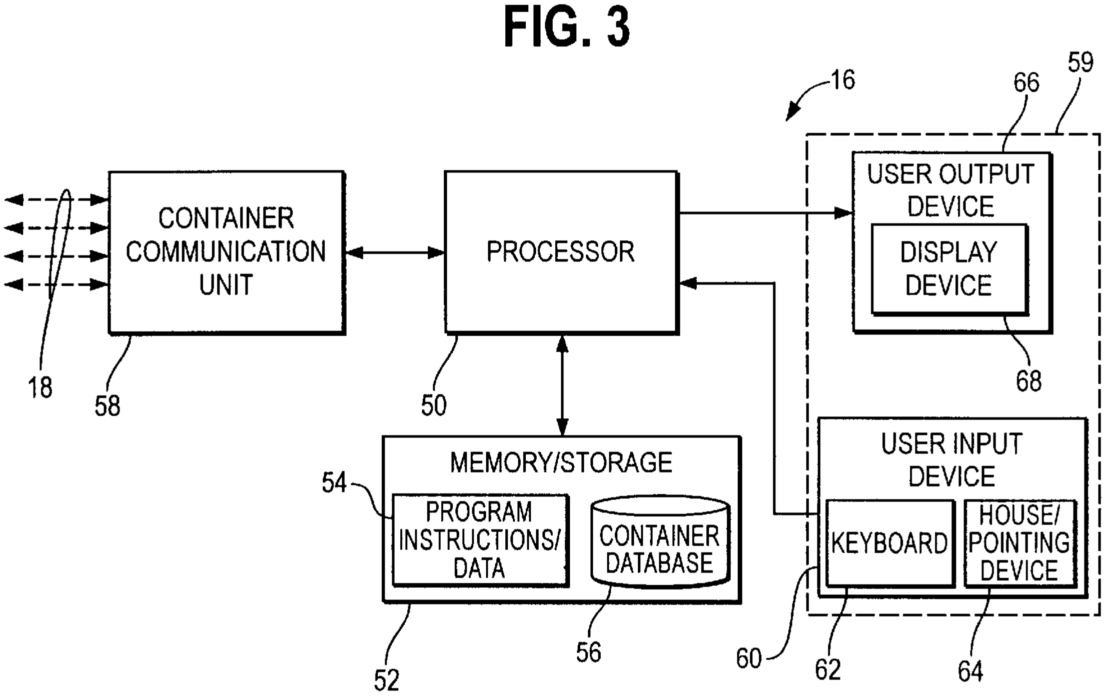
FIG. 3 is a block diagram of a processor unit for centrally managing one or more waste compactor containers, including waste compactor containers of the type illustrated in FIG. 2, for use in the waste compactor container network, illustrated in FIG. 1.

In at least one embodiment, the central computer 16, as illustrated in FIG. 3, includes a processor 50. The processor 50 is coupled to memory/storage 52, which contains program data and program instructions 54 for use by the processor 50. The memory/storage 52 can take the form of one or more well known forms of memory and/or storage devices and include solid state memory devices, like random access memories (RAM), or read only memories (ROM), and auxiliary storage devices, like optical or magnetic disk storage units. In the illustrated embodiment, the memory/storage 52 further includes a container database structure 56. Generally, the program data and instructions will be stored in a digital format, which can be read or written by the processor 50.

Under the control of the program instructions, the processor 50 will communicate with the monitoring units 14 of the one or more compactor containers 12 via a compactor container communication unit 58 or interface. The compactor container communication unit 58 can take one or more of several well known forms of communication. For example, similar to the communication device 42 of the monitoring unit 14, the compactor container communication unit 58 could include a modem for communicating over a telephone line connection, a radio transceiver for communicating over a wireless communication connection, as well as multiple other well known forms of communication. The specific form of communication of the compactor container communication unit 58, however, should generally be compatible with the form of communication used by the communication device 42. In at least one instance, communication between the compactor container communication unit 58 and the communication device 42 of the monitoring unit 14 can occur via a public global wide area communication network, such as the Internet.

The processor 50 is further coupled to an interface unit 59 including one or more user input devices 60, such as a keyboard 62, a mouse 64 or other type of pointing device. The input device could additionally or alternatively include a microphone for receiving voice commands, as well as other well known types of input devices. The user input device 60 facilitates entry of information from a user.

The interface unit 59 additionally includes one or more user output devices 66. Information is presented to a user via the one or more user output devices 66, which are also coupled to the processor 50, and which can similarly take one or more well known forms. Examples of user output devices 66 include a display device 68 for visually presenting the information, and/or speakers for audibly presenting the information to the user. In other instances, it may be desirable to have a more permanent visual record of the information, and in these instances a printer could be used to create the more permanent record. In some instances, a touch screen can be used for both presenting information to the user, as well as receiving information.

The central computer 16 generally functions under the control of the programming data and instructions 54 and the input received from the user and the monitoring devices 14, coupled to the compactor containers 12. At least one aspect of the programming data and instructions 54 monitors multiple pressure readings over time during each of the monitored compaction cycles. The pressure readings are then stored in the memory/storage 52 memory unit. The pressure readings can be stored as part of at least one of a log file, an indexed data structure, or any number of other well known methods of storage. This allows the pressure readings to be later retrieved and displayed as part of a graphical representation of a requested compaction cycle.

While the present invention has been described in connection with a processing unit 50 that is part of a central computer 16, which manages the operation of multiple waste compactor containers 12, the processing unit 50 could alternatively be incorporated as part of the monitoring unit 14, and/or dedicated to monitoring the operational data associated with a single waste compactor container 12.

Figure 4:
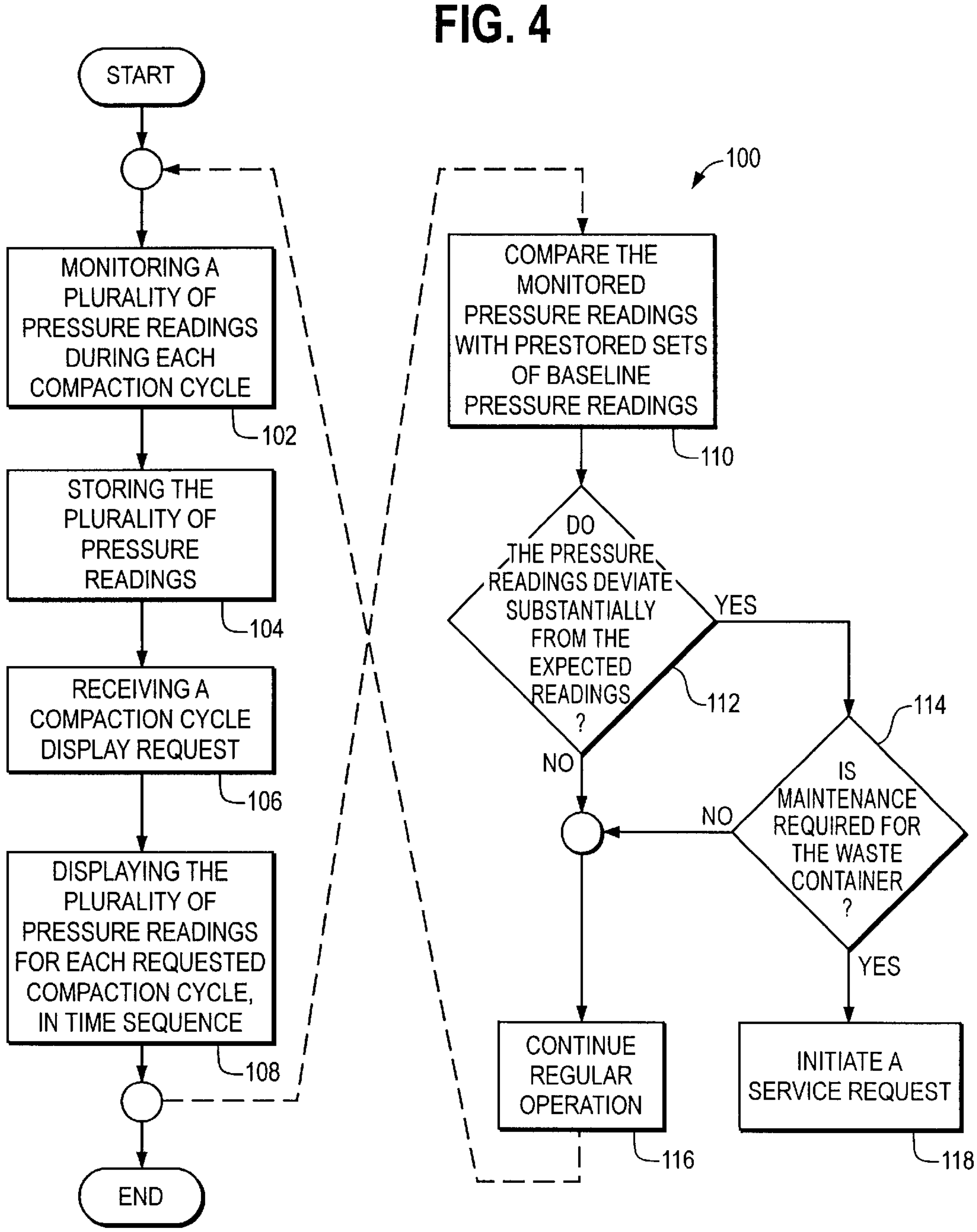
FIG. 4 is a flow diagram for graphically providing operational compactor status information of a waste compactor container performed by the processor unit illustrated in FIG. 3.

FIG. 4 illustrates a flow diagram 100 of at least one embodiment of a method for monitoring the operation of a waste compactor in accordance with the present invention. In the at least one embodiment, the flow diagram is implemented at least in part using stored programming data and instructions, that are being executed by a computer or processor, like the central computer 16 illustrated in FIG. 3, or the status processor 40 illustrated in FIG. 2. In some instances the process will be fully automated. In other instances some of the determinations and/or analysis can be performed by a human operator.

The system monitors the operation of the waste compactor container 12 by initially monitoring 102 a plurality of pressure readings produced during each of the one or more monitored compaction cycles. The monitored pressure readings are then stored, so as to be capable of being later retrieved. The monitoring system then receives a display request 106 for one or more of the compaction cycles. The system then displays the pressure readings 108 in time sequence. In at least one embodiment, the pressure readings are displayed 108 in the form of a graph of pressure versus time, also referred to as a stroke graph. From the graph it is sometimes possible to detect and determine the existence of problems beginning to develop or the development of possible failures in the operation of the waste compactors 12.

In at least one embodiment, the monitored pressure readings can be compared with one or more prestored sets of expected or baseline pressure readings 110, either visually or using programmed routines. In at least some instances the programmed routines can include a heuristic method or procedure. A determination is then made 112, whether the pressure readings deviate substantially from the prestored expected readings. If the pressure readings deviate sufficiently, a determination is made 114 as to whether a maintenance call or service request of the waste compactor container 12 is required. If not, regular operation is allowed to continue 116. If maintenance of the waste compactor container 12 is determined to be required, a service request is initiated 118.

A determination 114 that a maintenance call or service request is required could reflect that the comparison of the actual monitored pressure readings has deviated from the expected or baseline pressure readings to a degree that was sufficient to suggest an abnormality in the operation of the waste compactor container 12. Alternatively the actual monitored pressure readings could be further compared to one or more prestored sets of pressure readings during which known problems were being experienced.

It is further possible that the last several sets of pressure readings immediately prior to a failure of the waste compactor container 12 could give important clues as to the source of a particular failure being experience by the waste compactor container 12, which may have since ceased to function.

Figure 5:
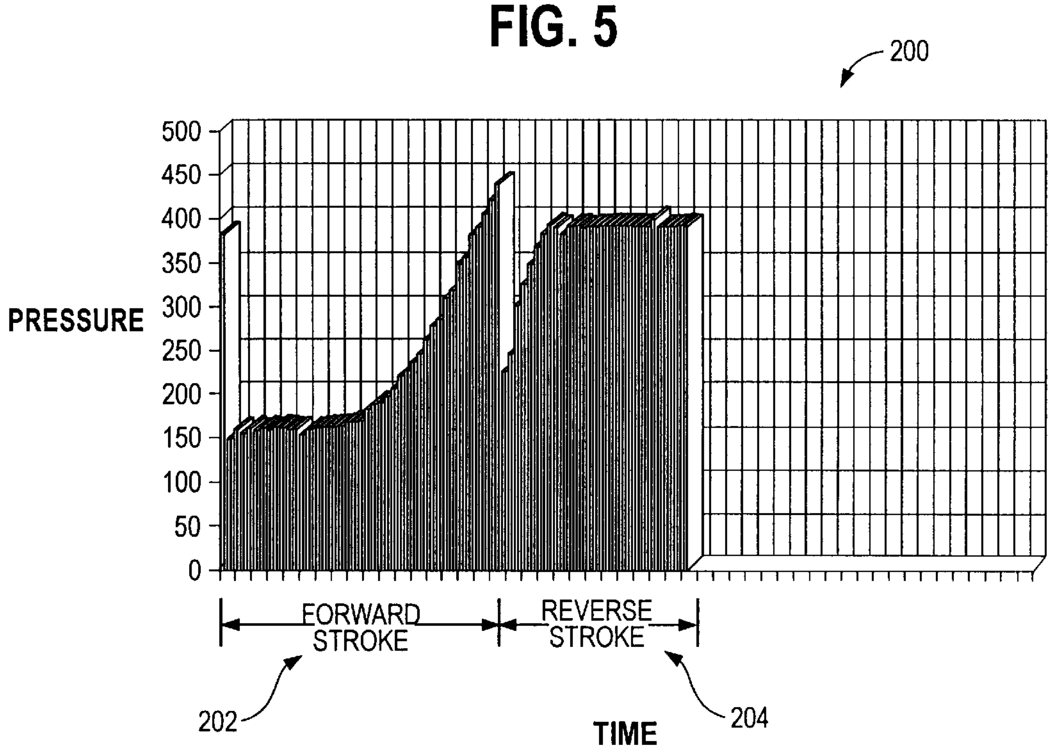
FIG. 5 is an exemplary graph depicting multiple pressure readings for a single stroke compaction cycle, in time sequence.

FIG. 5 illustrates an exemplary graph 200 depicting multiple pressure readings, in time sequence, for a compaction cycle having a single stroke. Specifically, the graph illustrates the pressure readings plotted versus time. A first group of pressure readings corresponds to the forward stroke 202 of a compacting assembly, or the portion of the stroke where the waste located inside of the container is being compressed. A second group of pressure readings corresponds to the reverse stroke 204, or the portion of the stroke where the mechanism used to compress the waste returns to its uncompressed state. In the embodiment illustrated in FIG. 2, the waste is compressed by a hydraulicly driven ram.

Figure 6:
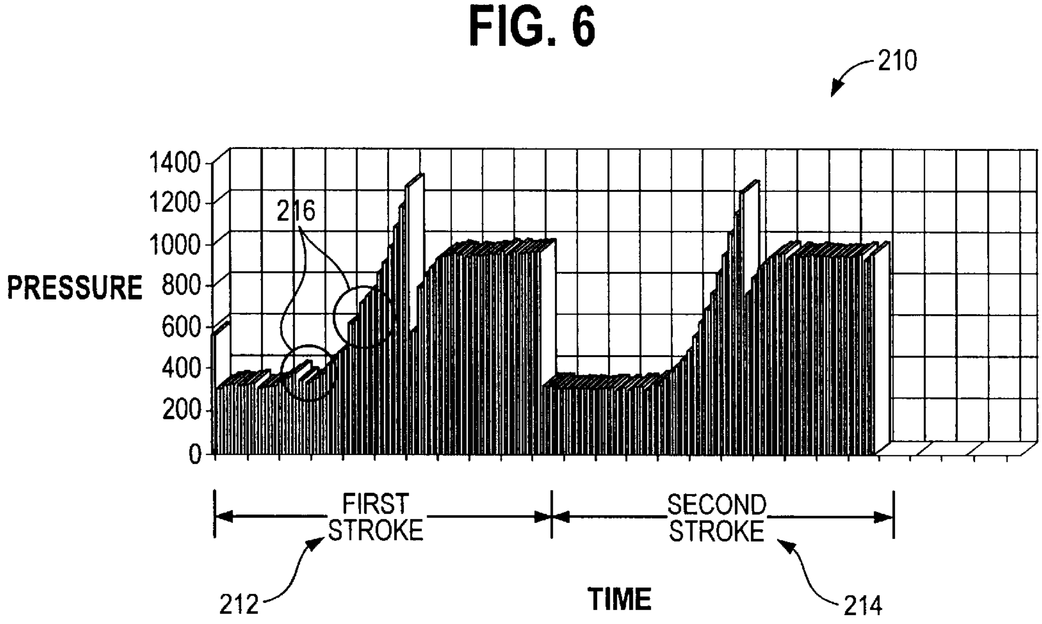
FIG. 6 is an exemplary graph depicting multiple pressure readings for a multiple or two stroke compaction cycle, in time sequence.

FIG. 6 illustrates an exemplary graph 210 depicting a compaction cycle, which includes two compaction strokes 212 and 214. It is interesting to note that subsequent compaction strokes tend to smooth out, wherein earlier compaction strokes can have some ripples and/or variances 216. This can be caused by an initial redistribution of the waste within the container after a new amount of waste is added to the container. During the initial stroke, if necessary, the waste can be redistributed to fill any existing voids, and/or existing blockages can be cleared. This allows the subsequent strokes to proceed more smoothly. Generally, in the illustrated example, the degree of variance in the first compaction strokes, and their subsequent absence in later compaction strokes, may not be sufficient to indicate any deviation from normal intended operation.

Figure 7:
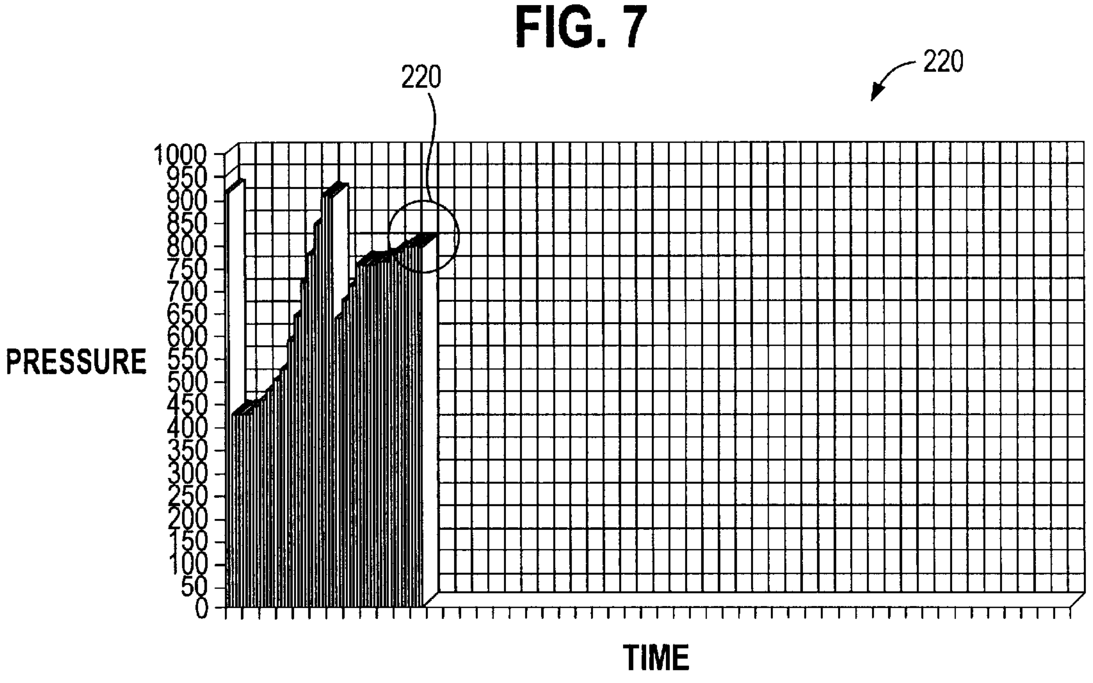
FIG. 7 is an exemplary graph depicting multiple pressure readings, in time sequence, for a compaction cycle having a single stroke, which deviates from an expected normal operation.

FIG. 7 illustrates a further graph 220 depicting multiple pressure readings plotted as a function of time. Graph 220 represents an example where an operating inconsistency might be noted, and correspondingly maintenance may be desired. Specifically, the curve of the graph is consistent with an operating condition where waste is located behind the ram. The condition is evidenced by an increase in the monitored pressure near the end of the reverse stroke of the compaction cycle. Based upon this information, a determination can be made as to whether a service request might be desirable. In some instances the early detection and resolution of potential or minor problems may help to avoid a later more serious problem.

FIG. 7 represents one example of possibly abnormal operation of a waste compactor container. It is further possible to detect other types of potential problems, which might manifest themselves as deviations from the expected pressure readings, that one would expect during a normal compaction cycle. Furthermore, this information could be used in combination with other types of diagnostic measurements, to either confirm or to substantiate suspected problems.

In addition to being used for diagnostic and/or maintenance purposes, the stroke graph can be used for other purposes. For example, in at least some instances, the pressure reading observed during the reverse stroke can be used to set the pressure reading corresponding to an empty compactor container for use in verifying when a pick-up has been made.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for monitoring the operation of a waste compactor container comprising:

a waste container for receiving waste material;

a compactor assembly, coupled to the waste container, for compacting the waste material received within the waste container;

a monitoring unit, coupled to the compactor assembly, for monitoring the operation of the compactor assembly, said monitoring unit including a pressure gauge for measuring the amount of pressure applied by the compactor assembly during a compaction cycle;

a processor unit, coupled to the pressure gauge, including prestored instructions for sampling multiple pressure readings, over time, during each of the one or more monitored compaction cycles, a storage unit for storing the sampled multiple pressure readings, and an interface unit including an input device for receiving a compactor cycle operation status request for one or more of the compaction cycles, and a display device for displaying the plurality of pressure readings of each of the one or more requested compaction cycles in a graph of pressure readings versus time on a graphical display.

2. The system of claim 1 wherein the compactor assembly includes a hydraulic driver and a ram.

3. The system of claim 2 wherein the hydraulic driver includes a pump, hydraulic lines, and a hydraulic reservoir including hydraulic fluid.

4. The system of claim 3 wherein the pressure gauge is a pressure transducer disposed in the path of the hydraulic fluid within the compacting assembly.

5. The system of claim 1 wherein the processor unit is part of the monitoring unit.

6. The system of claim 1 wherein the processor unit is part of a remote central computer.

7. The system of claim 6 wherein the remote central computer includes a communication unit for remotely communicating information received between the monitoring unit and the processor unit.

8. The system of claim 7 wherein the remote central computer is coupled to multiple monitoring units corresponding to multiple waste compactor containers.

9. The system of claim 1 wherein the multiple pressure readings sampled over time during each of the one or more monitored compaction cycles includes multiple pressure readings during a forward stroke and multiple pressure readings during a reverse stroke of the one or more compaction cycles.

10. The system of claim 1 wherein the prestored instructions are stored on a computer readable medium.

11. A system for monitoring the operation of one or more waste compactor containers within a waste compactor container network, each waste compactor container having associated therewith a waste container for receiving waste material, a compactor assembly, coupled to the waste container, for compacting the waste material received within the waste container; and a monitoring unit, coupled to the compactor assembly, for monitoring the operation of the compactor assembly, said monitoring unit including a pressure gauge for measuring the amount of pressure applied by the compaction assembly during a compaction cycle, the system comprising:

a processor unit, coupled to the pressure gauge, including prestored instructions for sampling multiple pressure readings, over time, during each of the one or more monitored compaction cycles, a storage unit for storing the sampled multiple pressure readings, and an interface unit including an input device for receiving a compactor cycle operation status request for one or more or the compaction cycles, and a display device for displaying the plurality of pressure readings of each of the one or more requested compaction cycles in a graph of pressure readings versus time on a graphical display.

12. A method of monitoring the operation of a waste compactor container including a waste container, a compactor assembly, and a monitoring unit, the method comprising steps of:

monitoring a plurality of pressure readings, over time, during each of one or more compaction cycles;

storing the plurality of pressure readings for each of the one or more monitored compaction cycles;

receiving a compaction cycle display request for one or more of the stored compaction cycles; and displaying the plurality of pressure readings of each of the one or more requested compaction cycles in a graph of pressure readings versus time on a graphical display.

13. The method of claim 12 where each compaction cycle includes one or more compaction strokes.

14. The method of claim 12 where the plurality of pressure readings include a plurality of pressure readings during the forward stroke of the compaction cycle and a plurality of pressure readings during the reverse stroke of the compaction cycle.

15. The method of claim 12 wherein the plurality of pressure readings are stored in at least one of a log file and an indexed data structure.

16. The method of claim 12 further comprising an additional step of comparing the monitored plurality of pressure readings with one or more prestored sets of baseline pressure readings corresponding to normal error free operation for determining any deviation of the operation of the waste compactor from the expected normal operation.

17. The method of claim 16 further comprising an additional step of determining a need for maintenance of the waste container, based at least in part on the comparison of the monitored plurality of pressure readings with the one or more prestored sets of baseline pressure readings.

18. The method of claim 12 wherein the plurality of pressure readings are monitored, stored and displayed as part of a centralized remote management system for a plurality of waste compactor containers.

* * * * *